United States Patent [19]
Klicka et al.

[11] 3,988,414
[45] Oct. 26, 1976

[54] TREATMENT OF WASTE WATER FROM URANIUM ORE PREPARATION

[75] Inventors: Vladimir Klicka, Prague; Josef Mitas, Bystryce pod Hostynem; Josef Vacek, Zliv, all of Czechoslovakia

[73] Assignee: Vyzkumny ustav chemickych zarizeni, Brno, Czechoslovakia

[22] Filed: Dec. 17, 1974

[21] Appl. No.: 533,714

[52] U.S. Cl. .......................... 423/18; 252/301.1 W; 159/45; 203/48
[51] Int. Cl.[2] .................................. C01G 43/00
[58] Field of Search ............... 159/45, DIG. 19; 23/305 F, 312 ME; 252/301.1 W; 203/48; 423/11, 18, 20

[56] References Cited
UNITED STATES PATENTS

| | | | |
|---|---|---|---|
| 2,078,088 | 4/1937 | Mantius et al. | 159/DIG. 19 |
| 2,322,134 | 6/1943 | Hodge | 23/305 E |
| 2,448,191 | 8/1948 | Pike | 23/296 |
| 2,739,044 | 3/1956 | Ashley et al. | 159/45 |
| 2,753,242 | 7/1956 | Davis | 23/25 |
| 2,876,182 | 3/1959 | Hopper et al. | 23/272 AH |
| 2,960,391 | 11/1960 | Sweet et al. | 23/305 FE |
| 3,361,649 | 1/1968 | Karter | 252/301.1 W |
| 3,743,484 | 7/1973 | Morimoto | 23/306 X |
| 3,870,606 | 3/1975 | Tabata et al. | 159/45 |
| 3,890,244 | 6/1975 | Carlin | 252/301.1 W |

Primary Examiner—Norman Yudkoff
Assistant Examiner—J. Sofer

[57] ABSTRACT

An improved closed-loop process is described for treating waste water resulting from chemical extraction of uranium from ore. The water is evaporated to form a concentrated solution and is then subjected to crystallization of the least soluble salt component thereof via further evaporation, or cooling or simultaneous cooling and a partial vacuum. The crystallized component is then separated from the mother liquor, whereupon the latter is fed back after removal of residual uranium therefrom to the the extraction installation to replace the acids used therein. Additionally, the pure condensate produced during evaporation of the waste waters is employed as a replacement for the fresh water employed in processing of the ore.

6 Claims, 2 Drawing Figures

3,988,414

TREATMENT OF WASTE WATER FROM URANIUM ORE PREPARATION

BACKGROUND OF THE INVENTION

The invention concers a process for the treatment of radioactively contaminated waste water emitted from installations for chemically preparing uranium ores. Uranium, which principally finds application as fissionable material or nuclear fuel in modern atomic power plants, is obtained from uranium ore which at most contains only a fraction of one per cent of uranium.

In order to extract the uranium, the ore is subjected to a chemical treatment after some preliminary filtration and other mechanical steps. During such chemical treatment, which employs fresh water and in which gross quantities of auxiliary chemicals (e.g. acids during the ion exchange or adsorption operations for removing certain radioactive components) are used up extraordinarily large amounts of radioactively contaminated amounts of waste water are generated. The waste water emitted from installations of this type is in the form of aqueous solutions of inorganic salts, and also contains residual uranium and elements resulting from the decomposition of uranium, such as radium, polonium and lead. The treatment of such waste water to negate its dangers represents a difficult problem for each installation.

Two principal methods of such treatment have been commonly employed. In one, which has been used where natural water courses or streams occur in the vicinity of the installation, the waste water is further diluted with water and discharged into the stream, usually after some pre-treatment via ion exchange or adsorption. Such treatment, of course, leads to radioactive contamination and poisoning of the water course.

In the second commonly used treatment method, employed where there are no water courses in the vicinity of the chemical treatment installation, the waste water is collected in a natural, open settling tank. The spent ore is collected in the bottom portion of the settling tank, while the remainder of the waste water which forms the top layer, is fed back to the installation for reuse.

The principal disadvantage of this latter scheme is that its life is limited, since the concentration of salt in the waste water gradually climbs to an unacceptable limiting value beyond which a re-use of the water is no longer possible. Additionally, such settling tanks are expensive to maintain and, of course, exhibit the danger that the salts accumulating in the lower ground layers can leak out, leading again to contamination or poisoning.

SUMMARY OF THE INVENTION:

The inventive process provides a safe and economical treatment technique for the waste water which avoids these problems and operates in an improved way to recover the waste water constituents for further re-use. This technique involves concentrating the waste water through evaporation, and crystallization of the least soluble salt component from the resulting solution. This component is removed from the mother liquor and supplied to a suitable external utilization apparatus. The remaining mother liquor is fed back (preferably after the residual uranium is removed therefrom) to the installation as a substitute for the acids employed for the adsorption portion of the treatment, while the condensate distilled from the waste water is fed back to the installation as a substitute for the fresh water employed therein.

The crystallization of the least soluble salt component is accomplished by subjecting the concentrated solutions to further evaporation, or to cooling, or to simultaneous cooling and vacuum evaporation.

The salt component crystallized after the first evaporation can, if desired, be redissolved to form a second concentrated solution, followed by re-crystallization to obtain a salt component of higher radioactive purity.

BRIEF DESCRIPTION OF THE DRAWINGS

The process in accordance with the invention is further explained with the aid of the accompanying drawings, in which.

DETAILED DESCRIPTION

Figure 1:
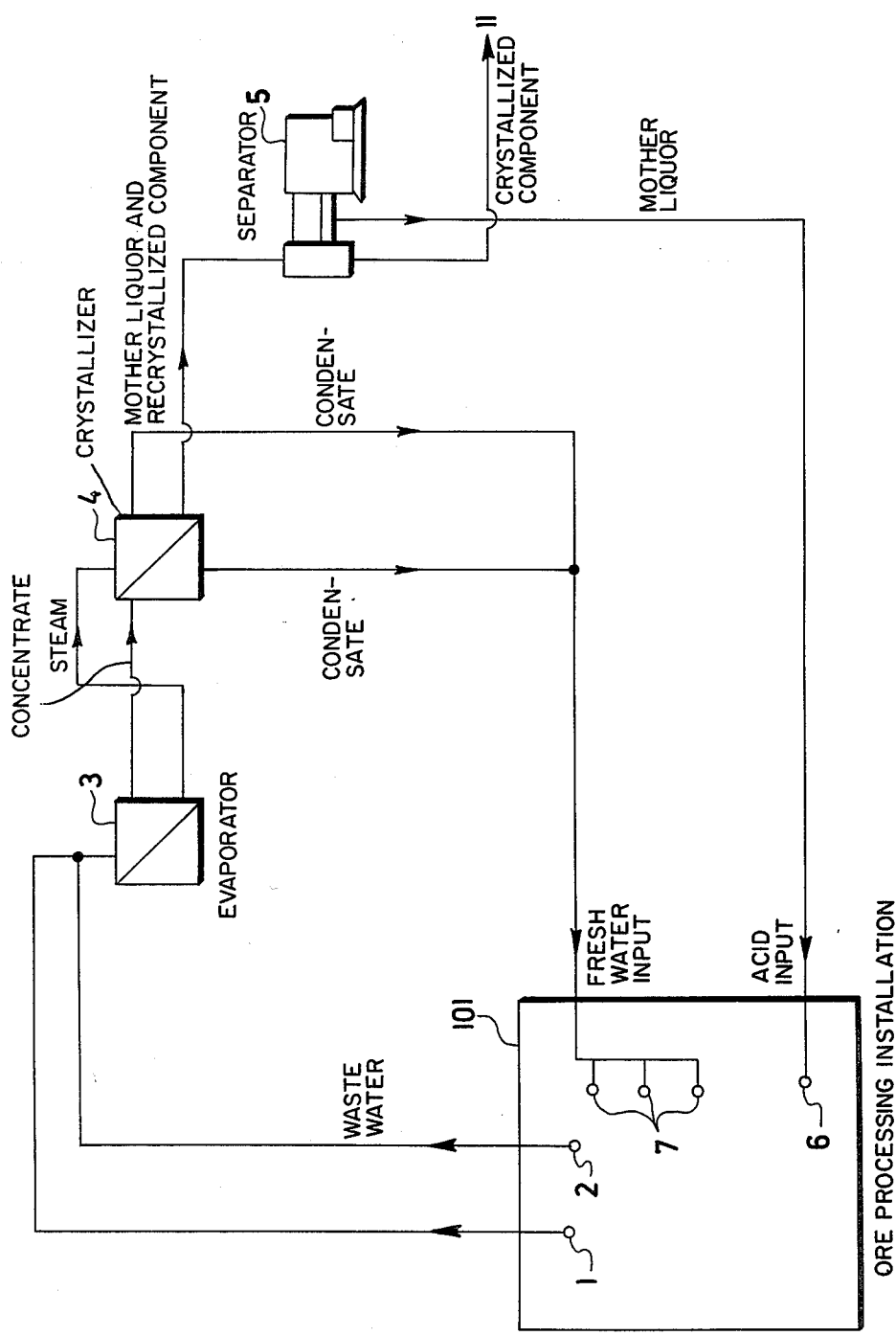
FIG. 1 is a flow diagram of an arrangement for the treatment of waste water emitted from an installation for the chemical preparation of uranium ore by an alkaline process.

In the flow diagram of FIG. 1, waste water to be treated in accordance with the invention is shown as exiting via ports 1 and 2 from an installation 101 for the chemical preparation of uranium from uranium ore via an alkaline process. Such installations, which conventionally include an adsorption stage which utilizes quantities of acids to partially purify the waste water prior to its emission via ports 1 and 2, employ large quantities of fresh water entering via ports 7 in the treatment of the ore.

The waste water emitted as ports 1 and 2 is formed from a watery solution of inorganic salts including sulphates, nitrates, carbonates and other anions which are associated with sodium, ammonium or similar cations. The solution additionally contains uranium together with radioactive elements resulting from the decomposition of uranium. The average total salt content typically amounts to more than 10 grams of salt per liter of waste water.

The waste water at the ports 1 and 2 may first be pre-treated via filtration, homogenization and other similar mechanical processes not represented in the flow diagram of FIG. 1, and is then conducted to an evaporation arrangement 3. The evaporator 3 can, for example, be embodied as a multi-stage evaporation station wherein the heat energy conducted to the first evaporation stage in the form of steam is repeatedly utilized.

In the evaporator 3, the waste water is concentrated via subjection to practically pure steam, to a highly concentrated salt solution. The concentrated salt solution is then led to a crystallizer 4, in which it is further concentrated (e.g. via further evaporation) whereby the salt constituent having the lowest solubility is crystallized from the solution. In the assumed case using an alkaline preparation of the uranium, the crystallized salt component typically consists principally of sodium sulphate.

The crystalline suspension is then brought to a conventional separator 5 (e.g. a centrifuge) where the crystalline sodium sulphate is separated out from the mother liquor containing the residual uranium and the radioactive elements resulting from uranium decomposition. If desired, the suspension can, before being brought to the separator 5, be introduced into a sedimentation or homogenization apparatus (not shown) in the lower part of which the suspension is further concentrated.

The mother liquor remaining after the separation operation is fed back to the installation 101 via port 6 as a replacement for the acids employed in the adsorption stage of the installation. If desired, residual uranium can be removed from the mother liquor by known processes prior to such feed back step.

The pure crystalline sodium sulphate separated in the unit 5, is suitably washed with pure water, dried, loaded in a transport container and supplied to an external utilization apparatus via port 11 to be used, e.g. for paper or glass manufacture.

The heat of condensation of the water condensed out of the evaporation apparatus 3 is advantageously employed, for example, for the heating of the crystallizer 4 when the latter is embodied as a further evaporator.

The pure water condensed during the second evaporation in the crystallizer 4 is then fed back, as shown, via ports 7 to the installation 101 in order to replace fresh water consumed during the ore treatment.

Figure 2:
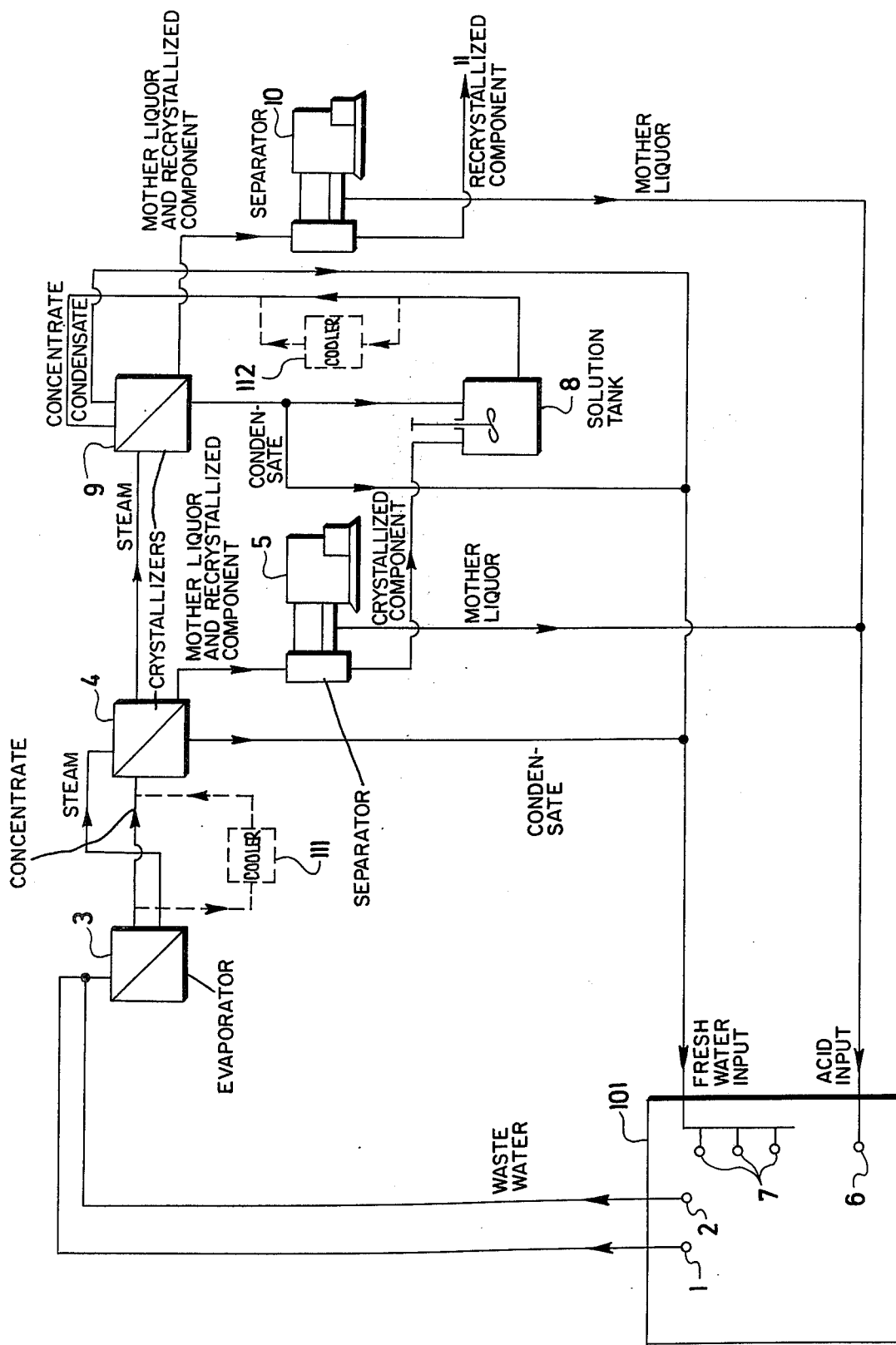
FIG. 2 is a flow diagram corresponding to that of FIG. 1 but including a further crystallization step whereby crystalline salt components of greater purity are obtained.

In those applications where an extremely high purity of the separated sodium sulphate is required, such separated component is subjected to an additional re-crystallization step as shown in FIG. 2, which corresponds to FIG. 1 up until the separator 5. In FIG. 2, the crystallized sodium sulphate from the separator 5 is dissolved in a solution tank 8 to form a second concentrated solution. Such solution is then led to a second crystallizer 9 (e.g. another evaporator) wherein the sodium sulphate is again crystallized. The purity of such last-mentioned component is one order of magnitude higher than that of the sodium sulphate emitted from the first crystallization operation. The dissolution of the crystalline sodium sulphate from the separator 5 in the solution tank 8 may be accomplished, e.g., by contacting such crystalline substance with a portion of the condensate from the crystallizer 9.

The crystalline suspension from the second crystallizer 9 is conducted to a second separator 10, where the re-crystallized sodium sulphate is separated from the mother liquor. A centrifuge can also be used as the second separator 10. The sodium sulphate separated at the unit 10 is supplied to the utilization apparatus via port 11.

In the arrangement of FIG. 2, the mother liquor emitted from the separators 5 and 10, the condensate from the crystallizers 4 and a portion of the condensate from the crystallizer 9 are respectively directed to the ports 6 and 7 for the purposes indicated above in connection with FIG. 1.

By reason of the fact that the solubility of sodium sulphate can be quickly reduced by cooling to below about 34° C, the units 4 and 9 can be arranged as cold crystallizers rather than steam crystallizers. In such cold crystallizers, the concentraed solution from the evaporation arrangement 3 and from the tank 8 are cooled down to a temperature of about 5° to 10° C in units 111 and 112, respectively shown in dotted lines in FIG. 2, whereby the sodium sulphate is crystallized in the form of so-called Glauber's salt. The latter is then separated from the mother liquor as indicated above and prepared for delivery in accordance with the requirements of the applicatiion.

The crystallization steps can also be advantageously carried out when the units 4 and 9 are adapted for simultaneous vacuum evaporation and cooling. In such cases, the solution from the units 3 and 8 boils in consequence of the negligible absolute pressure in the crystallizer whereby the solution becomes concentrated and at the same time is cooled to a temperature of 5° to 10° C. In this manner, a completely effective crystallization of the Glaubers' salt takes place.

Among the advantages of the process in accordance with the invention are its safety of operation and its economy of heat, water and chemicals, particularly during the effective feedback of steam condensate and the mother liquor. Also, it permits the effective use of installations in regions without large water courses, while avoiding the necessity of constructing spacious settling tanks with their attendant high maintenance expense and problems in removing the resultant radio-actively contaminated products.

Additionally, the cost savings resulting from the effective utilization via feedback of the decomposition or disintegration products of the waste water approximately make up for the cost of the processing of the waste water. Finally, through the use of multi-stage arrangements in each evaporation station and through the employment of the heat of condensation to run the crystallizer, the steam supply requirements can be significantly reduced.

In the foregoing, the invention has been described in connection with preferred arrangements thereof. Many variations and modifications will now occur to those skilled in the art. For example, the technique can be employed also with acidic ore treatment processes, which significantly differ from alkaline processes only in that they contain no carbonates. It is accordingly desired that the scope of the appended claims not be limited to the specific disclosure herein contained.

What is claimed is:

1. In a process for the treatment of waste water containing inorganic salts and emerging from an installation for chemically preparing uranium ore, said installation having a first inlet for receiving fresh water and a second inlet for receiving acids, the improvement comprising the steps of evaporating the waste water to a concentrated solution, crystallizing the least soluble salt component in the solution, separating such component from the mother liquor, feeding the remaining mother liquor back to the second inlet of the installation as replacement for the acids, and feeding condensate distilled from the waste water during the crystallizing step back to the first inlet of the installation as a replacement for the fresh water.

2. A process in accordance with claim 1, in which the crystallization of the least soluble salt component is accomplished by subjecting the concentrated solution to a further evaporation.

3. A process in accordance with claim 1, in which the crystallization of the least soluble salt component is accomplished by subjecting the concentrated solution to cooling.

4. A process in accordance with claim 1, in which the crystallization of the least soluble salt component is accomplished by subjecting the concentrated solution simultaneously to cooling and to a partial vacuum.

5. A process in accordance with claim 1, further comprising the further steps, after the separation of the least soluble salt component, of dissolving the separated component to form a concentrated solution, recrystallizing the least soluble salt component in such solution, and separating the recrystallized component from the mother liquor.

6. A process in accordance with claim 5, in which the dissolving step is accomplished by contacting the separated component with a portion of the condensate distilled from the solution during the recrystallizing step.

* * * * *